July 12, 1960
G. G. JORIS
2,945,072
ALKYLATION AND DEALKYLATION PROCESSES
Filed April 11, 1956
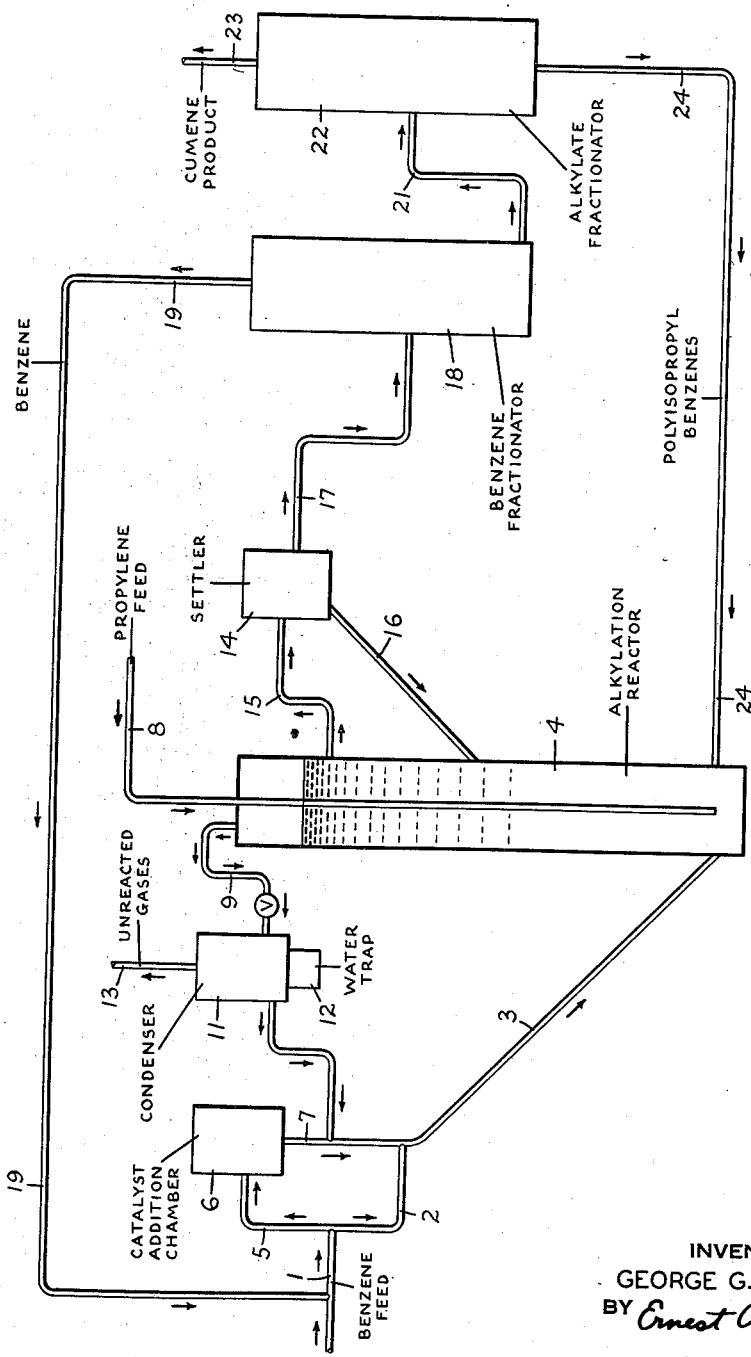
INVENTOR
GEORGE G. JORIS
BY Ernest A. Polin
ATTORNEY

United States Patent Office 2,945,072
Patented July 12, 1960

2,945,072
ALKYLATION AND DEALKYLATION PROCESSES

George G. Joris, Madison, N.J., assignor to Allied Chemical Corporation, a corporation of New York Filed Apr. 11, 1956, Ser. No. 577,586

12 Claims. (Cl. 260—671)

This invention relates to alkylation and dealkylation of aromatic compounds. More particularly, the invention is directed to propylation of benzene and halo-substituted benzenes and depropylation of their corresponding polypropylated products in the presence of certain clay catalysts.

Aluminum chloride has been used extensively as catalytic agent in the propylation of benzenes. However, aluminum chloride has several disadvantages, particularly for production of products having a high degree of purity. The principal difficulties are: (1) lack of selectivity which leads to the formation of ethylbenzene if there is ethylene in the propylene feed (presence of ethylbenzene interferes with the oxidation of cumene (isopropylbenzene) to cumene hydroperoxide in the production of phenol); (2) isomerization and disproportionation of propylbenzenes to form undesirable contaminants; (3) decomposition of aluminum chloride in the presence of water with formation of hydrogen chloride so that there are problems of excessive catalyst consumption and equipment corrosion; and (4) the propylation product and off-gas must be washed with water and caustic to remove any hydrogen chloride contamination.

Phosphoric acid catalysts have also been used in the propylation of benzenes. However, with these catalysts there is extensive by-product formation so that the yields are relatively low and product purification more difficult.

It has also been suggested to use clay catalysts in the propylation of benzenes and depropylation of polypropylbenzenes. However, due to the relative inactivity of these catalysts, high reaction temperatures, generally in the order of 200° C. or higher, have been required in order to obtain acceptable yields of desired product. Such high temperatures tend to favor polymerization and other undesirable side reactions.

An object of the present invention is to provide a method for propylation of benzene and halo-substituted benzenes and depropylation of their corresponding polypropylated products in the presence of certain acid-activated, non-swellable, bentonite-type clays.

Another object of the present invention is to provide a method for propylation of benzene and halo-substituted benzenes and depropylation of their corresponding polypropylated products in the presence of certain acid-activated, non-swellable, bentonite-type clays at relatively low temperatures.

A further object of the present invention is to provide a method for the propylation of benzene and halo-substituted benzenes under specifically defined conditions to produce exceptionally high yields of monopropylated products.

Still a further object of this invention is to provide a simple and economical process for separating a gaseous mixture of propylene and ethylene by reacting the gaseous mixture with benzene or a halo-substituted benzene in the presence of certain acid-activated, non-swellable, bentonite-type clays.

Other objects and advantages of the present invention will be apparent to those skilled in the art from the following description and examples.

In accordance with the present invention, high yields of propylated benzenes are produced by reacting an aromatic compound of the group consisting of benzene and halo-substituted benzenes with propylene in liquid phase in the presence of an acid-activated, non-swellable, bentonite-type clay having a base exchange capacity of at least about 20 and at a temperature of about 70° to 130° C. The resultant reaction product contains varying amounts of monopropylated and polypropylated materials, depending upon the particular conditions employed.

As stated above, benzene or halo-substituted benzenes are suitable aromatic reactants in the present invention. The halo-substituted benzenes include fluoro- and chloro-substituted compounds such as fluorobenzene and chlorobenzene. The preferred aromatic reactant is benzene itself. This compound, when alkylated with propylene, results in the highly valuable product, cumene.

The propylene reactant is preferably used as technical grade propylene or as a mixed propylene-propane gas. Technical grade propylene generally has a purity of not less than 95 percent by volume, the principal impurities being about 4 percent by volume of propane and small amounts of ethane. A typical mixed propylene-propane gas contains 48.2 percent by volume of propane, 48.8 percent by volume of propylene, 1.6 percent by volume of ethane, 1.0 percent by volume of isobutane, 0.3 percent by volume of ethylene and 0.2 percent by volume of $CO_2$.

The clays suitable for use as catalysts in the present invention are acid-activated clays of the non-swellable, bentonite-type having a base exchange capacity of at least about 20. These clays include acid-activated montmorillonite-type clays, as well as acid-activated fuller's earth having the minimum base exchange capacity. Montmorillonite, for example, is a hydrous aluminum silicate of the non-swellable, bentonite-type with a crystalline structure which can be expressed ideally as $$Al_2Si_4O_{10}(OH)_2 \cdot nH_2O$$

However, this ideal formula never occurs in nature because of ion substitution in definite patterns. One such substitution is the replacement of aluminum atoms by magnesium, which substitution makes the clay amenable to activation by acid treatment. Prior to use, moisture is removed from the clay. This may be effectively accomplished by refluxing the clay with benzene in a Dean and Stark apparatus until no more water collects in the water trap.

If the clay catalyst on hand is not acid-activated the catalyst may be activated by any suitable procedure. For example, a slurry of 1 part by weight of clay to 10 parts by weight of 5% sulfuric acid may be boiled for a period of about 1 hour. The excess spent acid may then be separated from the clay first by settling and decantation and then by wringing the wet clay. The "mud" thus produced may then be dried to a powder in a flash drier.

The base exchange capacity of clays may readily be determined by the following procedure. The clay is boiled with benzene in a flask provided with a moisture trap to remove any water present. The clay is then filtered through a steam-jacketed glass funnel and sucked dry for one hour using air which was dried by passing through "Drierite" (anhydrous calcium sulfate). To a weighed sample of the dried clay (usually 1.0 gram) an excess of a solution of 0.1 N n-butylamine in absolute methanol is added and stirred to insure complete neutralization of the "acid groups." The excess n-butylamine is titrated with an 0.05 N $H_2SO_4$ solution using a mixed indicator (1 part methyl red, 3 parts bromo-cresol green to make a 1 percent by weight solution in absolute methanol). The end point is a sharp color change from green to red at a pH of 5.0. The results obtained are expressed as milliequivalents of base per 100 grams of clay.

The quantity of catalyst has a great effect upon the rate of propylation and depropylation reactions, but causes no significant difference in the distribution of products in typical propylation and depropylation reaction mixtures. The quantity of catalyst employed should allow sufficient dispersion thereof by means of agitation afforded by the entering gas stream. Generally speaking, amounts of catalyst equivalent to about 1 to 25 weight percent of the liquid charge are employed, 10 to 15 weight percent being preferred. The clay catalysts of the present invention are very cheap and are quite long-lasting and may be used without reactivation for at least 200 hours.

Several methods of catalyst reactivation are possible. First, the catalyst may be steam-distilled to remove any organic materials present and then treated at a temperature ranging from about 20° to 100° C. for a period of about 1 to 4 hours. Or, if desired, the catalyst may be slurried in benzene and filtered. The residue is then slurried in a solution of aqueous sulfuric acid, heated to 80° C. for 1 hour and filtered hot. The residue is reslurried in fresh distilled water and finally dried under vacuum overnight. Agglomerates are crushed prior to use.

High yields of propylated product may be obtained by carrying out the propylation process of the present invention in liquid phase at a temperature of about 70° to 130° C. However, I have discovered that exceptionally high yields of monopropylated product are obtained at temperatures in the order of about 70° to 105° C.

In the event high selectivity with respect to monopropylated product is desired, it has also been found favorable to carry out the propylation reaction using about 4 to 10 mols of aromatic compound fed for each mol of propylene absorbed. Otherwise, mol ratios of about 0.5 to 10:1 have been found generally suitable. Although higher mol ratios may be employed in the process of the present invention, they have no added advantage and increase the distillation load in recovery of the desired products.

The present invention, although preferably carried out at atmospheric pressure, may also be carried out at superatmospheric pressure, as in the order of 5 to 150 pounds p.s.i.g. If superatmospheric pressure is employed, suitable provision must be made in the alkylation reactor for removing water from the catalyst since it has been found that the presence of small amounts of water under pressure conditions deactivates the clay catalysts of the present invention.

As stated hereinbefore, in the propylation of benzene and halo-substituted benzenes using the clay catalysts of this invention, varying amounts of polypropylated materials are obtained. If high yields of these materials are desired, the propylation reaction is advantageously carried out at temperatures between 105° and 130° C., using less than 4 mols of aromatic compound fed for each mol of propylene absorbed.

Propylation of benzene in accordance with the present invention results in the production of para-, meta- and ortho-diisopropylbenzenes, triisopropylbenzene and possibly tetraisopropylbenzenes, in addition to cumene. The diisopropylbenzenes and higher isopropylbenzenes may be readily separated from the cumene by fractional distillation. If desired, the diisopropylbenzene fraction may then be further treated by procedures known to the art to separate the para-, meta- and ortho-isomers in substantially pure form. I have found that exceptionally high proportions, e.g. about 50% or higher, of the para-isomer are thus obtained, in contradiction to results obtained with other alkylation catalysts such as aluminum chloride. Obtainment of high concentrations of para-diisopropylbenzene is particularly desirable since the para-isomer is employed in the production of the highly valuable terephthalic acid which has gained wide use in the manufacture of polyester fibers.

According to one aspect of the present invention, the polypropylated materials are separated from monopropylated materials, as by simple fractional distillation, and are then reacted with additional benzene or halo-substituted benzene at about 90° to 130° C. in the presence of an acid-activated, non-swellable, bentonite-type clay having a base exchange capacity of at least about 20 to effect depropylation of the polypropylated materials and to produce additional quantities of monopropylated product. As will be apparent to those skilled in the art, the polypropylated materials to be treated may be obtained from any other suitable source. When temperatures of about 90° to 105° C. are employed, I have discovered that the rate of depropylation may be increased by use of a clay catalyst having a base exchange capacity of at least about 40. As in the propylation procedure of my invention, this depropylation procedure is carried out in the liquid phase. Although atmospheric pressure is preferred, superatmospheric pressure conditions may be successfully used.

If desired, the polypropylated materials, after separation from monopropylated materials, may under certain conditions be recycled to the propylation step of the present invention. If the propylation procedure is carried out at temperatures between 105° and 130° C., such recycling is feasible using an acid-activated, non-swellable, bentonite-type clay having a base exchange capacity of at least about 20. If, however, the temperature of the propylation procedure is in the range of about 90° to 105° C., use of an acid-activated, non-swellable, bentonite-type clay having a base exchange capacity of at least about 40 has been found necessary to obtain substantial and simultaneous propylation and depropylation reactions.

One specific embodiment of the present invention is concerned with treatment of a gaseous mixture containing propylene and ethylene. I have found that these gases may be efficiently separated by reacting the gaseous mixture with benzene or a halo-substituted benzene, preferably benzene, in liquid phase in the presence of an acid-activated, non-swellable, bentonite-type catalyst having a base exchange capacity of at least about 20 and at a temperature of about 70° to 130° C., preferably about 70° to 105° C. Under these conditions the propylene component is selectively and completely converted into valuable propylated products while the ethylene component remains substantially unchanged, small percentages, if any, reacting with the aromatic compound. The ethylene component may then be removed from the system for further usage. As indicated above, if high yields of monopropylated product are desired, reaction temperatures of about 70 to 105° C., as well as a mol ratio of about 4 to 10 mols of aromatic compound fed for each mol of propylene absorbed, are employed.

This separation of propylene and ethylene gases is significantly important in the preparation of ethylene-free propylene gas. In the usual deethanizer operation for preparation of an ethylene-free propylene gas from an ethylene-propylene gaseous mixture, the ethylene fraction contains a substantial amount of propylene. By combining the deethanizer operation with the aromatic compound-clay catalyst treatment of the gaseous mixture, as described above, a supply of both ethylene and propylene substantially free from each other is obtained for chemical processes in which such purity is desirable, for example, for production of polyethylene and ethylene glycol, as well as for production of alkyl chloride and propylene glycol.

Where the desired propylene end product is cumene, and particularly where there is already an existing aluminum chloride alkylating installation, a particularly efficient operation may be employed. In this operation the overhead from the deethanizer comprising propylene-containing ethylene gas is treated with benzene under conditions described above in the presence of an acid-activated, non-swellable, bentonite-type clay having a base exchange capacity of at least about 20. Ethylene gas, substantially free of propylene, is recovered. The crude propylated product, as well as the bottoms of the deethanizer column, comprising substantially pure propylene, are then added to benzene and subjected to alkylation in the presence of aluminum chloride under conditions well known to those skilled in the art. In this operation there is complete utilization of the propylene for cumene production; the ethylene content of the initial ethylene-propylene gas is substantially unchanged and recovered as a propylene-free ethylene gas; and the deethanizer operation is simplified.

The steps of the present process may be illustrated by reference to the accompanying drawing which is a flow diagram of one arrangement of conventional units of equipment suitable for the practice of the invention. In the description of the flow diagram, for illustrative purposes the aromatic compound employed is benzene.

Benzene feed enters through line 1 and then passes through lines 2 and 3 to alkylation reactor 4. Alternatively, benzene feed may be introduced through lines 1 and 5 to catalyst addition chamber 6 and then passed via lines 7 and 3 to reactor 4. Propylene gas is introduced through line 8 to reactor 4. The reactor, which is any conventional reactor for contacting reactants and catalyst, contains a dried, acid-activated, non-swellable, bentonite-type clay having a base exchange capacity of at least about 20. Prior to operation, the reactor is steamed, washed with benzene and spent catalyst slurry and finally with fresh benzene. Fresh dried catalyst, as required, is added to the reactor from catalyst addition chamber 6 via lines 7 and 3. The reaction between benzene and propylene is carried out in the reactor in liquid phase at a temperature of about 70° to 130° C., and preferably about 70° to 105° C. Generally, the operation is performed in a condition of constant temperature. The duration of the operation varies greatly and is determined by the time required to approach or reach steady state equilibrium. The mol ratio of benzene fed to propylene absorbed is about 0.5 to 10:1, preferably about 4 to 10:1.

During operation reactor 4 is filled with liquid above product take-off line 15, but a free space is maintained at the top of the reactor. When the feed comprises an ethylene-propylene gaseous mixture, the unreacted ethylene gas containing entrained benzene and propylated product passes out of reactor 4 through valved line 9 to condenser 11. Condensed material is returned to the bottom of reactor 4 by means of line 3. A water trap 12 placed below condenser 11 removes any water present in the condensate. Uncondensed ethylene passes out of condenser 11 through line 13 and may be recovered in any suitable manner.

The reaction products comprising unreacted benzene, cumene and polyisopropylbenzenes pass to settler 14 via line 15. In settler 14 separation of the catalyst from reaction products is accomplished. The separated catalyst is passed through line 16 to reactor 4 for further use. The catalyst-free reaction products then pass from settler 14 via line 17 to benzene fractionator 18. In fractionator 18 benzene is removed as overhead through line 19 and may be recycled to line 1 as benzene feed. The bottoms of fractionator 18 pass through line 21 to alkylate fractionator 22. In fractionator 22 an overhead comprising cumene (isopropylbenzene) is removed through line 23 as product. The bottoms of the fractionator which comprises polyisopropylbenzenes may be removed through line 24 and, if desired, recycled to reactor 4 for dealkylation reaction. In the event such recycling is accomplished, the temperature in reactor 4 should be maintained within the range of about 90° to 130° C. If the acid-activated, non-swellable, bentonite-type catalyst has a base exchange capacity of about 40 or greater, such reaction temperature may suitably be maintained within the range of about 90° to 105° C. Alternatively, the polyisopropylbenzenes may be fractionally distilled to separate diisopropylbenzene and higher isopropylbenzene fractions. The diisopropylbenzene fraction may then be further treated to separate the para-, meta- and ortho-isomers.

Various details have been omitted from the drawing for the sake of simplicity and clarity. These details, such as valves, pumps, automatic controls, etc., will be readily supplied by those skilled in the art.

The following examples will serve to illustrate the various aspects of the present invention. However, these examples are not to be considered as limitations of the invention since a great many modifications and possible applications will be evident in view of the scope and teachings of this disclosure.

*Example 1.*—Benzene was reacted with propylene gas in the presence of an acid-activated, non-swellable, bentonite-type clay catalyst having a base exchange capacity of 100. The reaction was carried out in liquid phase at a temperature which ranged from about 79° C. at the beginning of the reaction to about 90° C. at the end of the reaction. The ratio of benzene fed to propylene absorbed was about 4.0 mols of benzene to one mol of propylene. The catalyst comprised 14.2 percent by weight of the benzene charge. After about 4⅓ hours of reaction, the reaction products were fractionated. First, unreacted benzene was removed, and the cumene (isopropylbenzene) was separated from polyisopropylbenzenes. The reaction products contained 61.8 weight percent benzene, 34.0 weight percent cumene and 4.2 weight percent polyisopropylbenzenes.

*Example 2.*—Propylation of fluorobenzene was carried out by reacting fluorobenzene with propylene gas, in mol ratio of about 6.8 mols of fluorobenzene fed for each mol of propylene absorbed, and in the presence of an acid-activated, non-swellable, bentonite-type clay catalyst having a base exchange capacity of 60. The reaction was carried out in liquid phase at a temperature of about 82° to 95° C. The amount of catalyst used was about 7.4 percent by weight of the liquid charge. After a run of about 7½ hours' duration, reaction products were obtained which, upon fractionation, yielded 78.7 weight percent fluorobenzene, 15.5 weight percent 4-fluorocumene and 4.75 weight percent fluoropolyisopropylbenzenes, according to infrared analysis.

*Example 3.*—Polyisopropylbenzenes were dealkylated in the presence of benzene to form cumene. In this run 311.3 parts by weight of the polyisopropylbenzenes and 311.3 parts by weight of benzene were reacted in the presence of 87 parts by weight of an acid-activated, non-swellable, bentonite-type clay catalyst having a base exchange capacity of 60. The reaction was carried out in liquid phase, the temperature at the beginning of the reaction being 94.5° C. and rising to 109.0° C. after 72 hours. The reaction products comprised 31.2 weight percent benzene, 50.1 weight percent cumene and 18.7 weight percent polyisopropylbenzenes.

*Example 4.*—A fraction containing triisopropylbenzenes and diisopropylbenzenes was reacted with cumene and benzene, in mol ratio or 1.0 mol each of triisopropylbenzenes and diisopropylbenzenes to 1.0 mol of cumene and 2.16 mols of benzene, over 12.8 percent by weight of the liquid charge of an acid-activated, non-swellable, bentonite-type clay having a base exchange capacity of 60. The reaction was in liquid phase and at a temperature which ranged from about 109° C. at the beginning of the reaction to about 129.5° C. after about 17 hours of reaction. The reaction products comprised benzene, cumene, diisopropylbenzenes and triisopropylbenzenes, in mol ratio of 1.23:2.39:1.41:0.14, respectively.

*Example 5.*—A gaseous mixture comprising 50 percent by volume ethylene and 50 percent by volume propylene was reacted with benzene, in mol ratio of about 2.5 mols of benzene fed to one mol of gaseous mixture absorbed, in the presence of an acid-activated, non-swellable, bentonite-type clay catalyst having a base exchange capacity of 60. The catalyst constituted 19.5 percent by weight of the liquid charge. At the beginning of the reaction the temperature was 79° C. and after about 35 hours a temperature of 94° C. was reached. The reaction products were fractionated and only about 0.5 weight percent ethylbenzene was found. The reaction products also contained 47.7 weight percent benzene, 38.0 weight percent cumene and 14.3 weight percent polyisopropylbenzenes.

*Example 6.*—Benzene was reacted with propylene gas and recycled polyisopropylbenzenes in the presence of an acid-activated, non-swellable, bentonite-type clay catalyst having a base exchange capacity of 120. The catalyst constituted 13 percent by weight of the liquid charge. The polyisopropylbenzenes in the recycle stream were made up of 62 weight percent of diisopropylbenzenes and 38 weight percent of triisopropylbenzenes. The mol ratio of benzene, diisopropylbenzenes and triisopropylbenzenes fed to each mol of propylene absorbed was about 3.8, 0.32 and 0.16:1. The reaction was carried out in liquid phase at a temperature of 91.5° C. for 6½ hours. The resultant reaction products comprised 67.9 mol percent benzene, 19.1 mol percent cumene, 8.7 mol percent diisopropylbenzenes and 4.2 mol percent triisopropylbenzenes.

*Example 7.*—Benzene was reacted with propylene gas in the presence of an acid-activated, non-swellable, bentonite-type clay catalyst having a base exchange capacity of 22. The reaction was carried out in liquid phase at a temperature which ranged from about 79° C. at the beginning of the reaction to about 90° C. at the end of the reaction. The ratio of benzene fed to propylene absorbed was about 1.8 mols of benzene to one mol of propylene. The catalyst comprised 14.5 percent by weight of the benzene charge. After a run of about 14 hours' duration, the reaction products were fractionated. First, unreacted benzene was removed, and then cumene was separated from polyisopropylbenzenes. The reaction products contained 44.2 weight percent benzene, 36.6 weight percent cumene and 19.2 weight percent polyisopropylbenzenes.

As will be apparent to those skilled in the art, the present invention may be carried out in batchwise, cyclic or continuous manner.

The monopropylbenzenes of the present invention are useful in the preparation of various commercial products such as phenol, acetone and fluorophenols. Further, cumene has been found to be a very valuable constituent in aviation fuels. In addition, terephthalic and isophthalic acids may be produced by oxidation of para- and meta-diisopropylbenzenes, respectively.

Although certain embodiments of the invention have been described for the purposes of illustration, it will be evident that various changes and modifications may be made therein without departing from the scope and spirit of the invention.

I claim:

1. A process for producing propylated benzenes which comprises reacting an aromatic compound of the group consisting of benzene and halo-substituted benzenes with propylene in liquid phase in the presence of an acid-activated, non-swellable, bentonite-type clay having a base exchange capacity of at least about 20 and at a temperature of about 70° to 130° C.

2. A process for producing propylated benzenes which comprises reacting an aromatic compound of the group consisting of benzene and halo-substituted benzenes with propylene, in mol ratio of about 0.5 to 10 mols of aromatic compound fed to 1 mol of propylene absorbed, in liquid phase in the presence of an acid-activated, non-swellable, bentonite-type clay having a base exchange capacity of at least about 20 and at a temperature of about 70° to 130° C.

3. A process for producing cumene which comprises reacting benzene with propylene in liquid phase in the presence of an acid-activated, non-swellable, bentonite-type clay having a base exchange capacity of at least about 20 and at a temperature of about 70° to 130° C.

4. A process for producing 4-fluorocumene which comprises reacting fluorobenzene with propylene, in liquid phase in the presence of an acid-activated, non-swellable, bentonite-type clay having a base exchange capacity of at least about 20 and at a temperature of about 70° to 130° C.

5. A process for producing cumene which comprises reacting benzene with propylene, in mol ratio of about 0.5 to 10 mols of benzene fed to one mol of propylene absorbed, in liquid phase in the presence of an acid-activated, non-swellable, bentonite-type clay having a base exchange capacity of at least about 20 and at a temperature of about 70° to 130° C.

6. A process for producing cumene which comprises reacting benzene with propylene, in mol ratio of about 4 to 10 mols of benzene fed to 1 mol of propylene absorbed, in liquid phase in the presence of an acid-activated, non-swellable, bentonite-type clay having a base exchange capacity of at least about 20 and at a temperature of about 70° to 105° C.

7. A process for producing propylated benzenes of lower molecular weight which comprises reacting an aromatic compound of the group consisting of benzene and halo-substituted benzenes with polypropylated benzenes in liquid phase in the presence of an acid-activated, non-swellable, bentonite-type clay having a base exchange capacity of at least about 20 and at a temperature of about 90° to 130° C.

8. A process for producing cumene which comprises reacting benzene with polyisopropylbenzenes in liquid phase in the presence of an acid-activated, non-swellable, bentonite-type clay having a base exchange capacity of at least about 20 and at a temperature of about 90° to 130° C.

9. A process for producing cumene which comprises reacting benzene with polyisopropylbenzenes in liquid phase in the presence of an acid-activated, non-swellable, bentonite-type clay having a base exchange capacity of at least about 40 and at a temperature of about 90° to 105° C.

10. A process for producing monopropylated benzenes which comprises reacting an aromatic compound of the group consisting of benzene and halo-substituted benzenes with propylene in liquid phase in the presence of an acid-activated, non-swellable, bentonite-type clay having a base exchange capacity of at least about 20 and at a temperature between 105° and 130° C., thereby forming a product comprising monopropylated and polypropylated benzenes, separating said monopropylated and polypropylated benzenes and recycling said polypropylated benzenes to the reaction zone for reaction with aromatic compound therein to form additional monopropylated benzenes.

11. A process for producing cumene which comprises reacting benzene with propylene in liquid phase in the presence of an acid-activated, non-swellable, bentonite-type clay having a base exchange capacity of at least about 20 and at a temperature between 105° and 130° C., thereby forming a product comprising cumene and polypropylated benzenes, separating said cumene and polypropylated benzenes and recycling said polypropylated benzenes to the reaction zone for reaction with benzene therein to form additional cumene.

12. A process for producing cumene which comprises reacting benzene with propylene in liquid phase in the presence of an acid-activated, non-swellable, bentonite-type clay having a base exchange capacity of at least about 40 and at a temperature of about 90° to 105° C., thereby forming a product comprising cumene and polypropylated benzenes, separating said cumene and polypropylated benzenes and recycling said polypropylated benzenes to the reaction zone for reaction with benzene therein to form additional cumene.

References Cited in the file of this patent

UNITED STATES PATENTS

| | | |
|---|---|---|
| 2,010,949 | Egloff | Aug. 13, 1935 |
| 2,143,493 | Stanley et al. | Jan. 10, 1939 |
| 2,403,748 | Olin | July 9, 1946 |
| 2,410,111 | Thomas et al. | Oct. 29, 1946 |
| 2,442,342 | Burk et al. | June 1, 1948 |
| 2,564,488 | Mahan | Aug. 14, 1951 |

FOREIGN PATENTS

| | | |
|---|---|---|
| 681,049 | France | May 8, 1930 |
| 316,951 | Great Britain | Nov. 6, 1930 |